United States Patent
Bland et al.

(10) Patent No.: US 8,721,899 B2
(45) Date of Patent: May 13, 2014

(54) METHOD AND APPARATUS FOR THE CONTINOUS PRODUCTION OF LOW CONCENTRATIONS OF CHLORINE DIOXIDE FROM LOW CONCENTRATIONS OF AQUEOUS CHLORITE

(75) Inventors: Jack Bland, Richmond, VA (US); Douglas McIlwaine, Ashland, VA (US); John Richardson, Hanover, VA (US); Michael Burke, Saint Charles, MO (US)

(73) Assignee: ChemTreat, Inc., Glen Allen, VA (US)

( * ) Notice: Subject to any disclaimer, the term of this patent is extended or adjusted under 35 U.S.C. 154(b) by 726 days.

(21) Appl. No.: 12/813,492

(22) Filed: Jun. 10, 2010

(65) Prior Publication Data

US 2011/0000860 A1 Jan. 6, 2011

Related U.S. Application Data

(60) Provisional application No. 61/185,987, filed on Jun. 10, 2009.

(51) Int. Cl.
*C01B 11/02* (2006.01)
*C02F 1/76* (2006.01)

(52) U.S. Cl.
USPC ............ 210/748.2; 210/748.01; 210/748.1; 210/748.11; 210/748.13; 210/757; 204/157.48; 204/157.5; 252/187.21; 422/22; 422/24; 422/129; 422/186.3

(58) Field of Classification Search
USPC ............... 210/748.01, 748.1, 748.11, 748.13, 210/748.2, 754, 757; 422/22, 24, 129, 189, 422/186.3; 204/157.48, 157.5; 252/187.21
See application file for complete search history.

(56) References Cited

U.S. PATENT DOCUMENTS

| 7,695,692 | B2 * | 4/2010 | Sanderson | ................. | 422/186.3 |
| 2005/0121308 | A1 * | 6/2005 | Brownfield et al. | ..... | 204/157.48 |

* cited by examiner

*Primary Examiner* — Joseph Drodge
*Assistant Examiner* — Cameron J Allen
(74) *Attorney, Agent, or Firm* — Brummett TechLaw PLLC

(57) ABSTRACT

Provided are methods and systems for continuously producing low concentrations of chlorine dioxide from dilute solutions of sodium chlorite. The low concentrations of chlorine dioxide produced allow for reduced exposure risk with direct application of the chlorine dioxide stream. The incorporation of a suitable chlorine dioxide detector permits continuous monitoring and control of chlorine dioxide production ensuring that the process stays within regulatory guidelines. Pretreatment of reaction water is preferred for achieving suitable conversion rates of the low concentrations of chlorite to chlorine dioxide.

9 Claims, 5 Drawing Sheets

| TIME | STATUS/ACTION | FLOW RATE (GPM) | CLO2 ANALYZER ppm | CLO2 TEST | UV INTENSITY ($\mu W/cm^2$) | TEMPERATURE |
|---|---|---|---|---|---|---|
| 12:30 | Water flowing through carbon and softener. Flow meter total reset. No leaks. Power on to Hach Unit. Good flow. Same membrane. No Total Cl2, No hardness. | 2.5 | 0 | | n/a | 74 |
| 12:45 | Power on to UV. | 2.5 | 0 | | 449 | |
| 1:00 | UV OFF. Chlorite On 4-20 control | 2.6 | 0 | | | |
| 1:05 | UV OFF. Chlorite On 4-20 control. Water on to Twister | 3.5 | 0 | | | |
| 1:15 | Sample taken for ZERO/Blank. UV turned on | 3.5 | 0.0004 | | | |
| 1:20 | Reset UV setting to 100% | 3.5 | 0.0002 | | 644 | 84 |
| 1:25 | | | | | 615 | 85 |
| 1:30 | | 3.5 | 0.0002 | 0.09 | | |
| 1:50 | New Clo2 membrane and electrolyte | 3.5 | 0 | | 674 | 85 |
| 2:30 | Flow increased | 4.6 | 0 | | 1006 | 109 |
| 2:40 | High temp warning | 4.6 | 0 | 0 | 1650 | 113 |
| 2:45 | Flow decreased | 1.5 | 0 | | 1377 | 114 |
| 3:00 | Removed old filter cartridge in middle chamber. Unit down. | | | | | |
| | | | | | | |
| 9:25 | Derating unit 1 lamp in center | 3.2 | 0.42 | 0.47 | 30 | 73 |
| 10:05 | Derating unit 2 lamps in center | 3.2 | 0.56 | | 60 | 73 |
| 10:15 | Derating unit 3 lamps in center | 3.2 | 0.52 | | 133 | |
| 10:32 | Derating unit 3 lamps in center; 2 on outside | 3.2 | 0.4 | | 176 | |
| 10:46 | Derating units, 7 lamps | 3.2 | 0.25 | | 225 | |
| 11:10 | Derating unit 3 lamps in center | 3.2 | 0.54 | | 117 | |

FIG. 4

METHOD AND APPARATUS FOR THE CONTINOUS PRODUCTION OF LOW CONCENTRATIONS OF CHLORINE DIOXIDE FROM LOW CONCENTRATIONS OF AQUEOUS CHLORITE

PRIORITY STATEMENT

This application claims the benefit of priority under 35 U.S.C. §119(e) from U.S. Provisional Patent Application No. 61/185,987, which was filed in the United States Patent & Trademark Office on Jun. 10, 2009, the contents of which are hereby incorporated, in their entirety, by reference.

TECHNICAL FIELD

The present invention relates to the continuous production of an aqueous stream containing low concentrations of chlorine dioxide, wherein the continuous stream can be used directly for application without further dilution. The production of this stream reduces the associated risks of storing or handling more concentrated solutions of chlorine dioxide. The present invention creates concentrations of chlorine dioxide that reduce the potential for exceeding atmospheric toxicology thresholds. The invention also provides for monitoring and controlling the production of chlorine dioxide by using an inline chlorine dioxide sensor which can control the quantity of chlorine dioxide generated through a feedback loop.

BACKGROUND OF THE INVENTION

Chlorine dioxide, $ClO_2$, is a yellow to reddish-yellow manufactured reactive gas that has a broad number of industrial applications including, for example, bleaching wood and disinfecting industrial and municipal waters. Due to its reactive nature, chlorine dioxide is generally made in situ by chemical or electrochemical reaction. Chlorine dioxide does not occur naturally in the environment and is generally not suitable for commercial storage or transport as a gas because it is explosive under pressure. One of the most important physical properties of chlorine dioxide is its high solubility in water, particularly in chilled water. Chlorine dioxide dissolved in water does not hydrolyze to any appreciable extent but remains in solution as a dissolved gas.

Chlorine dioxide can be generated from a variety of compounds including the oxychlorine anions such as chlorite or chlorate. For most commercial applications, chlorine dioxide can be formed by sodium chlorite reacting with gaseous chlorine ($Cl_{2(g)}$), hypochlorous acid (HOCl), or hydrochloric acid (HCl). UV irradiation of chlorite solutions will also generates chlorine dioxide; however it is also well known that chlorine dioxide solutions are commonly destroyed by UV light in water basins that are exposed to sunlight or bright fluorescent lights.

Chlorine dioxide is used in a diverse range of applications including as a bleaching agent at paper manufacturing plants, and in public water treatment facilities to make water safe to drink. A common application of chlorine dioxide in drinking water in the United States has been for control of tastes and odors associated with algae and decaying vegetation. Chlorine dioxide is also effective in destroying taste and odor producing phenolic compounds. Chlorine dioxide can be used to oxidize both iron and manganese. Chlorine dioxide reacts with the soluble forms of iron and manganese to form precipitates that can be removed through sedimentation and filtration. Chlorine dioxide is more effective as a disinfectant than chlorine against water borne pathogenic microbes such as viruses, bacteria and protozoa in most circumstances. In 2001, chlorine dioxide and chlorite were used to decontaminate a number of public buildings following the release of anthrax spores in the United States.

DISCUSSION OF CONVENTIONAL ART

U.S. Pat. No. 4,414,180 and U.S. Pat. No. 4,456,511, the contents of which are hereby incorporated, in their entirety, by reference, disclose a method for generating chlorine dioxide gas by metering nitrogen or air directly into a generator containing aqueous sodium chlorite, and illuminating the solution with one or more incandescent or fluorescent lamps. The sodium chlorite is photochemically oxidized to chlorine dioxide and the resulting chlorine dioxide is taken into the gas phase by the nitrogen or air gas stream.

U.S. Pat. No. 4,874,489, the contents of which are hereby incorporated, in its entirety, by reference, discloses a batch process for generating chlorine dioxide by subjecting chlorite to ultraviolet radiation. The chlorine dioxide can easily be displaced from the reaction with air and dissolved in water to form chlorous acid.

U.S. Pat. No. 6,171,558, the contents of which are hereby incorporated, in its entirety, by reference, discloses a chlorine dioxide generator for use with a container holding aqueous chlorite. The apparatus includes a lamp for generating radiation, a connector or cap attached to the lamp so that the lamp is positioned within the container, and a circulation tube proximate to the light for circulating the aqueous chlorite in contact with the lamp radiation to create chlorine dioxide. Finely divided gas bubbles sweep microbubbles of chlorine dioxide upwardly from the exterior surface of the quartz housing through exit apertures and then on to the use for which it was generated. After the aqueous chlorite solution is depleted, the ultraviolet portion of the generator can be removed and reinstalled in a new container of aqueous chlorite, or moved to another location.

There are, however, a number of shortcomings with the prior art devices and methods for producing chlorine dioxide by irradiating an aqueous chlorite including, for example:

1) batch processes, when compared relative to continuous processes, typically require more equipment and are more expensive;

2) removing the chlorine dioxide from solution as a gas significantly reduces the efficiency which can be obtained;

3) with batch processes, the pH typically increases above 10, thereby reducing the conversion of chlorite to chlorine dioxide;

4) in batch processes, the heat from the lamp(s) is typically not sufficiently dissipated, thereby resulting in a higher lamp operating temperature and suppressing the desired ultraviolet output;

5) in batch processes, the photolytic decomposition of the desired chlorine dioxide tends to suppress the chlorite to chlorine dioxide conversion efficiency; and 6) in batch processes, significant and undesirable side reactions tend to produce unwanted by-products, also tending to reduce the overall conversion efficiency.

U.S. Pat. No. 6,171,558 ("the '558 patent"), the contents of which are hereby incorporated, in its entirety, by reference, discloses a generator for continuously creating chlorine dioxide in which a lamp is positioned in a container holding aqueous chlorite, and the aqueous chlorite is circulated through a circulation tube. A shield reduces contact between the lamp radiation and the aqueous chlorite outside of the circulation tube. The aqueous chlorite in the circulation tube is irradiated by the lamp to generate chlorine dioxide that can then be removed from the container with a vacuum eductor or can be transported with a gas sparge. Continuous production of the chlorine dioxide can be monitored and controlled with a control module which detects the quantity of chlorine dioxide generated. The generator reduces safety hazards associated with the handling of chlorite solutions and provides an inexpensive, portable system for the in situ generation of chlorine dioxide.

The '558 patent also discloses, however, that ultraviolet radiation will cause a photochemical reaction with chlorite forming chlorine dioxide and also that the ultraviolet radiation will cause the destruction of the chlorine dioxide. An additional shortcoming of the disclosed method is that it requires the removal of chlorine dioxide from the chlorite solution using a gas sparge, thereby increasing the handling and safety issues because of the low threshold for airborne concentrations of chlorine dioxide.

The present invention avoids the need to sparge the chlorine dioxide and relies on its generation at application concentrations through a continuous rather than a batch process. In the present invention the probability of continued photolysis of the chlorine dioxide is reduced by selection of solution flow rates and UV lamp ratings as well as the chlorite concentration which in terms of the prior art is very dilute.

U.S. Pat. No. 7,311,884 ("the '884 patent"), the contents of which are hereby incorporated, in its entirety, by reference, discloses a system for continuous production of low levels of chlorine dioxide using an aqueous metal chlorite solution which is diluted to about 0.001 wt % to about 0.25 wt % and reacting this with an ultraviolet lamp. The inventors claim a conversion efficiency of between 20% and 43% of chlorite to chlorine dioxide to produce on the low end of this range from 0.0002 wt % to 0.00043 wt % chlorine dioxide in aqueous solution.

The shortcomings of the system disclosed in the '884 patent related to the conversion efficiency and the quantity of chlorine dioxide produced. In addition, little detail is provided regarding other parameters that can have a significant impact on the results obtained by the system, specifically the influent water quality and chlorine dioxide residual monitoring.

In typical treated water applications the levels of chlorine dioxide required are in the range 0.2-0.5 ppm (equivalent to 0.00002 wt %-0.00005 wt %) which are approximately ten times lower than the lowest levels reported for the system disclosed in the '884 patent. The higher concentrations of chlorine dioxide produced by the system disclosed in the '884 patent would, therefore, typically require special handling and precautions, complications and additional expense that the method according to the present invention eliminates.

Other references that generally illustrate the state of the art include, 1) G. V. Buxton & M. S. Subhani, Radiation Chemistry & Photochemistry of Oxychlorine Ions Parts 1-3, pp. 947-977, Oct. 18, 1971, Cookridge High Energy Radiation Research Centre; 2) H. Cosson and W. R. Ernst, Photodecomposition of Chlorine Dioxide and Sodium Chlorite in Aqueous Solution by Irradiation with Ultraviolet Light, Ind. *Eng. Chem. Res.* 1994, 33, 1468-1475, 1994 American Chemical Society and 3) T. Aoki and K. Fujie, Formation of Chlorine Dioxide from Chlorite by UV Irradiation, *Chemistry Express*, vol. 7, no. 8, pp. 609-612 (1992), Kinki Chemical Society, Japan. The contents of each of these references are hereby incorporated, in their entirety, by reference.

BRIEF SUMMARY

The present invention relates to the continuous production of an aqueous stream containing low concentrations of chlorine dioxide, wherein the continuous stream can be used directly for application without further dilution. The production of this stream reduces the risks associated with storing and/or handling more concentrated solutions of chlorine dioxide. The present invention creates concentrations of chlorine dioxide that reduce the potential for exceeding atmospheric toxicology thresholds. The invention also provides for monitoring and controlling the production of chlorine dioxide by using an inline chlorine dioxide sensor which can control the quantity of chlorine dioxide generated through a feedback loop. To achieve the desired conversion rates, specific water quality must be utilized. The invention specifies suitable methods for achieving the desired water quality.

The presently disclosed system provides a number of advantages over known chlorine dioxide generators including, for example, improved safety and reliability, the ability to produce a continuous chlorine dioxide stream having a low concentration of chlorine dioxide (about 0.00005 wt % to about 0.00002 wt %) suitable for direct use in a number of applications. Applications in which the currently disclosed chlorine dioxide generator systems can be utilized in areas where exposure to higher levels of chlorine dioxide could be hazardous.

The conversion efficiency of the chlorite to chlorine dioxide process in this method is typically rather low, e.g., about 10% or less. This low conversion efficiency is, however, desirable so that the method produces very low concentrations of chlorine dioxide while making the process intrinsically safe and still delivering sufficient chlorine dioxide for the application.

BRIEF DESCRIPTION OF DRAWINGS

Example embodiments described below will be more clearly understood when the detailed description is considered in conjunction with the accompanying drawings, in which:

FIG. 4 illustrates data collected during a test run of a system operating according to a method according to the disclosure.

Figure 1:
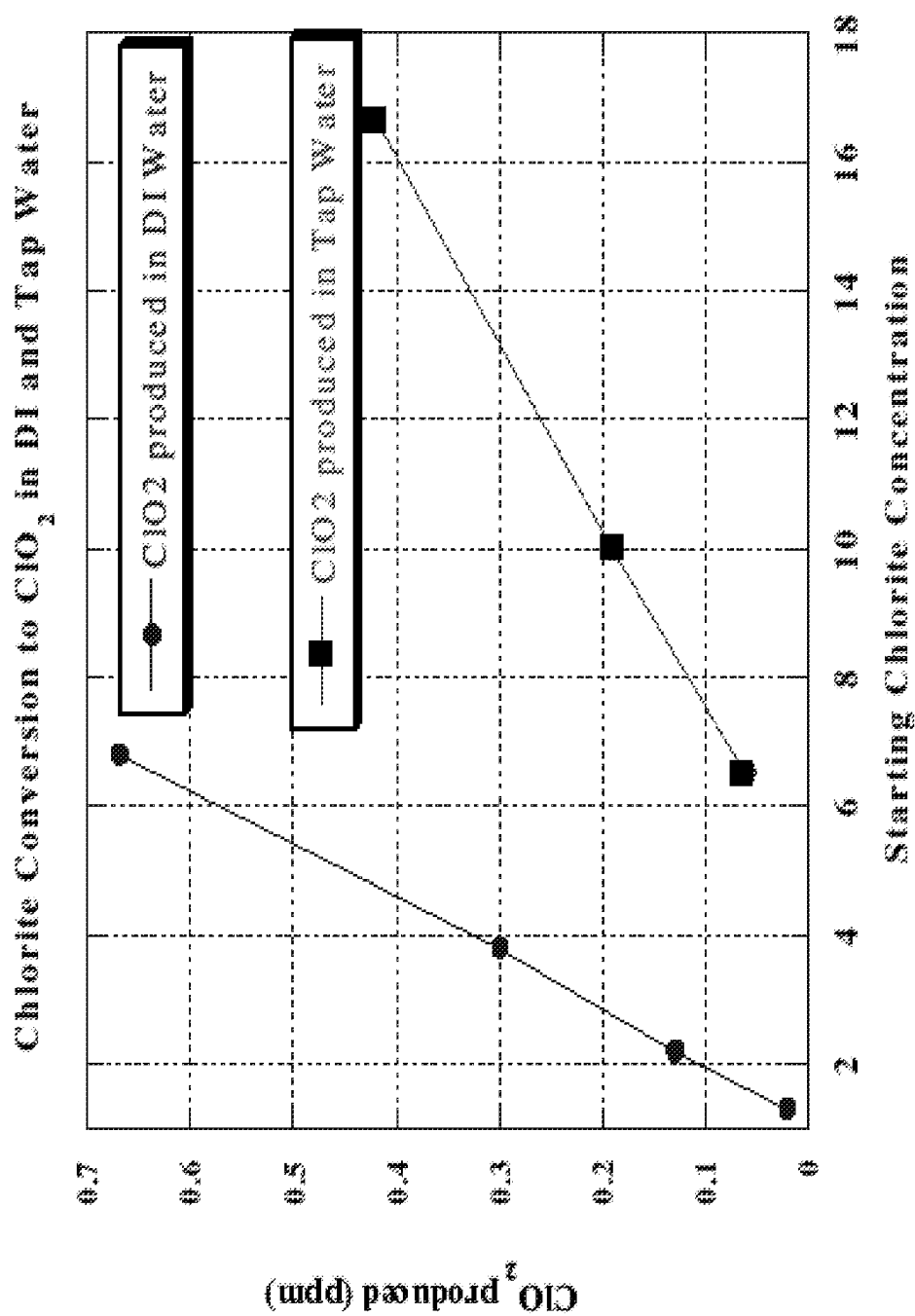
FIG. 1 illustrates the effect of feed water quality on the chlorite conversion in a method according to the disclosure.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

The present invention relates to methods, apparatus and systems for the continuous production of an aqueous stream containing low concentrations of chlorine dioxide whereby the aqueous product stream is suitable for direct use and does not require dilution or other processing. By producing a low concentration product stream, the present invention reduces the well-known and significant risks associated with storing and/or handling concentrated solutions of chlorine dioxide. By producing a low concentration product stream, the present invention reduces the potential for exceeding atmospheric toxicology thresholds. The presently disclosed system also provides for monitoring and controlling the production of chlorine dioxide using an inline chlorine dioxide sensor which can control the quantity of chlorine dioxide generated through a feedback loop.

The presently disclosed system provides a number of advantages over known chlorine dioxide generators including, for example, improved safety and reliability, the ability to produce a continuous chlorine dioxide stream having a low concentration of chlorine dioxide (about 0.00005 wt % to about 0.00002 wt %) suitable for direct use in a number of applications. Applications in which the currently disclosed chlorine dioxide generator systems can be utilized in areas where exposure to higher levels of chlorine dioxide could be hazardous.

It is anticipated that applications of the disclosed systems and methods may, for example, include:

- Use in the beverage and brewing industry to provide a sanitary rinse for conveyers and product rinse systems wherein the volatile nature of the chlorine dioxide will provide antimicrobial and odor control in the vapor phase as well as the liquid phase;
- Use in general sanitation procedures for clean-in-place (CIP) requirements for food plants, producing and intrinsically safe sanitizer;
- Use in vegetable, meat and seafood washing;
- Use in pre-treatment solutions to control biofouling for reverse osmosis (RO) membranes;
- Use in treating or production of potable water in large potable systems as a periodic disinfectant and/or as a means to provide potable water to regions which lack sanitary conditions; and
- Use in treating recreational water, e.g., swimming pools, spas.

The conversion efficiency of the chlorite to chlorine dioxide process in this method is typically rather low, e.g., about 10% or less. This low conversion efficiency is, however, desirable so that the method produces very low concentrations of chlorine dioxide while making the process intrinsically safe and still delivering sufficient chlorine dioxide for the application.

Although the water quality parameters that provide improved results with the disclosed method and system reflect specific preferred water quality parameters in terms of pH, turbidity, halogen, transition metals, and transmission to achieve the desired results, the method and system also provides certain advantages including, for example:

- No chemical reaction systems are required thereby eliminating the storage and handling of hazardous liquid acids and concentrated chlorite solution;
- The UV process is self-limiting and thereby reduces the potential for producing quantities of chlorine dioxide above environmental thresholds; and
- The method can be implemented with portable equipment and/or could be used with low power sources, LED light sources and/or pulsed UV sources.

In order to achieve the desired chlorite conversion rates, a number of factors must be utilized considered including the available water quality including, for example, the presence of various ionic species and pH, system operating parameters, as well as any ion exchange media and/or carbon media that may be utilized. Investigations of these various factors were conducted during the development of the disclosed systems and methods with the results detailed below.

Impact of Water Quality

Better water quality tends to translate into improved chlorite conversion. Accordingly, in order to achieve the desired chlorite conversion rates it is preferred that the feed water meet specific water quality standards.

The influence of water quality on the conversion of chlorite to chlorine dioxide was investigated by the following experiments. Five gallons (18.9 liters) of deionized water was placed into a reaction vessel along with sodium chlorite and thoroughly mixed. The chlorite containing solution was pumped through a UV reaction chamber at a flow rate of 2 gallons (7.6 liters) per minute and collected. The concentration of the chlorine dioxide produced was determined using the Hach Low Range $ClO_2$ method. There was no pH adjustment in the feed water and a sample of the chlorite containing solution was taken prior to reaction so the actual concentration of chlorite used could be determined. This experiment was repeated using several different chlorite concentrations and the results are shown below in TABLE 1.

TABLE 1

| Sample | Chlorite conc (ppm) | $ClO_2$ produced (ppm) |
| --- | --- | --- |
| 1 | 6.8 | 0.67 |
| 2 | 3.8 | 0.30 |
| 3 | 2.2 | 0.13 |
| 4 | 1.3 | 0.02 |

In a similar manner, the experiment described above was repeated using tap water. Five gallons (18.9 liters) of dechlorinated tap water was placed into a reaction vessel along with sodium chlorite and thoroughly mixed. The chlorite containing solution was pumped through a UV reaction chamber at a flow rate of 2 gallons (7.6 liters) per minute and collected. The concentration of the chlorine dioxide produced was determined using the Hach Low Range $ClO_2$ method. There was no pH adjustment in the feed water and a sample of the chlorite containing solution was taken prior to reaction so the actual concentration of chlorite used could be determined. This experiment was repeated using several different chlorite concentrations and the results are shown below in TABLE 2.

TABLE 2

| Sample | Chlorite conc (ppm) | $ClO_2$ produced (ppm) |
| --- | --- | --- |
| 1 | 6.5 | 0.06 |
| 2 | 10.0 | 0.19 |
| 3 | 16.7 | 0.42 |

The graph illustrated in FIG. 1 illustrates the combined results of these two experiments and clearly reflects the increased production obtained by using deionized water rather than tap water in preparing the chlorite solution.

Influence of Ion Exchange Media and Carbon Media

The effect of water quality on the production of chlorine dioxide was further examined in the following experiments. Five gallons (18.9 liters) of tap water taken from a Midwestern city was charged into a reaction vessel, and spiked with 11.8 ppm of sodium chlorite. This water was passed through the UV reaction chamber at a flow rate of 4 gallons/minute (15.1 liters/minute) and collected. The concentration of the chlorine dioxide produced was determined using the Hach Low Range Chlorine Dioxide method. There was no pH adjustment in the feed water and a sample of the chlorite containing solution was taken prior to reaction so the actual concentration of chlorite used could be determined. No chlorine dioxide was detected. This water was then passed several times through a 10 inch (25 cm) mixed bed deionization filter cartridge to remove dissolved ions. The water was then spiked with 13.1 ppm of sodium chlorite, and passed through the UV reaction chamber, and collected. The concentration of the chlorine dioxide produced was determined using the Hach Low Range Chlorine Dioxide method and it was observed that 0.57 ppm of chlorine dioxide was produced.

Five gallons (18.9 liters) of softened tap water taken from a Midwestern city was charged into a reaction vessel, and spiked with 10.2 ppm of sodium chlorite. This water was passed through the UV reaction chamber at a flow rate of 4 gallons/minute (15.1 liters/minute) and collected. The concentration of the chlorine dioxide produced was determined using the Hach Low Range Chlorine Dioxide method. There was no pH adjustment in the feed water and a sample of the chlorite containing solution was taken prior to reaction so the actual concentration of chlorite used could be determined. No chlorine dioxide was detected. The water as received contained no free halogen based oxidizing biocide, but contained 1.6 ppm of total halogen based biocide.

In order to remove the residual halogen based oxidizing biocide, the water was passed several times through a 10 inch (25 cm) carbon Block Cartridge filter to remove residual organics, or halogen based oxidizing biocide. After several passes through the filter, the concentration of the total halogen was 0 ppm. The water was then spiked with 11.3 ppm of sodium chlorite, and passed through the UV reaction chamber, and collected. The concentration of the chlorine dioxide produced was determined using the Hach Low Range Chlorine Dioxide method and it was observed that 0.26 ppm of chlorine dioxide was produced.

Impact of Flow Rate/Residence Time

The effect of flow rate through the UV reaction chamber will also affect the amount of chlorine dioxide produced. To demonstrate this, the following experiments were performed. Five gallons (18.9 liters) of deionized water was placed into a reaction vessel along with predetermined amount of sodium chlorite and thoroughly mixed. The chlorite containing solution was pumped through a UV reaction chamber at various flow rates and collected. The concentration of the chlorine dioxide produced was determined using the Hach Low Range $ClO_2$ method. The results are shown below in TABLE 3.

TABLE 3

| Trial | Flow rate | Chlorite Conc (ppm) | $ClO_2$ Produced (ppm) |
| --- | --- | --- | --- |
| 1 | 0.5 gal (1.9 liters)/min | 7.3 | 0.26 |
| 2 | 1.0 gal (3.8 liters)/min | 7.4 | 0.62 |
| 3 | 2.0 gal (7.5 liters)/min | 7.3 | 0.82 |

This experiment demonstrates that within the range of flow rates tested, higher flow rates will result in more chlorine dioxide formed. This indicates the possibility that the UV light could also be degrading the chlorine dioxide in solution. As will be appreciated by those skilled in the art, the particular configuration of the chlorite reactor and the UV illumination will affect both the residence time and the intensity and duration of the UV exposure as the chlorite solution transits the chlorite reactor.

Influence of pH on Chlorine Dioxide Production

Figure 2:
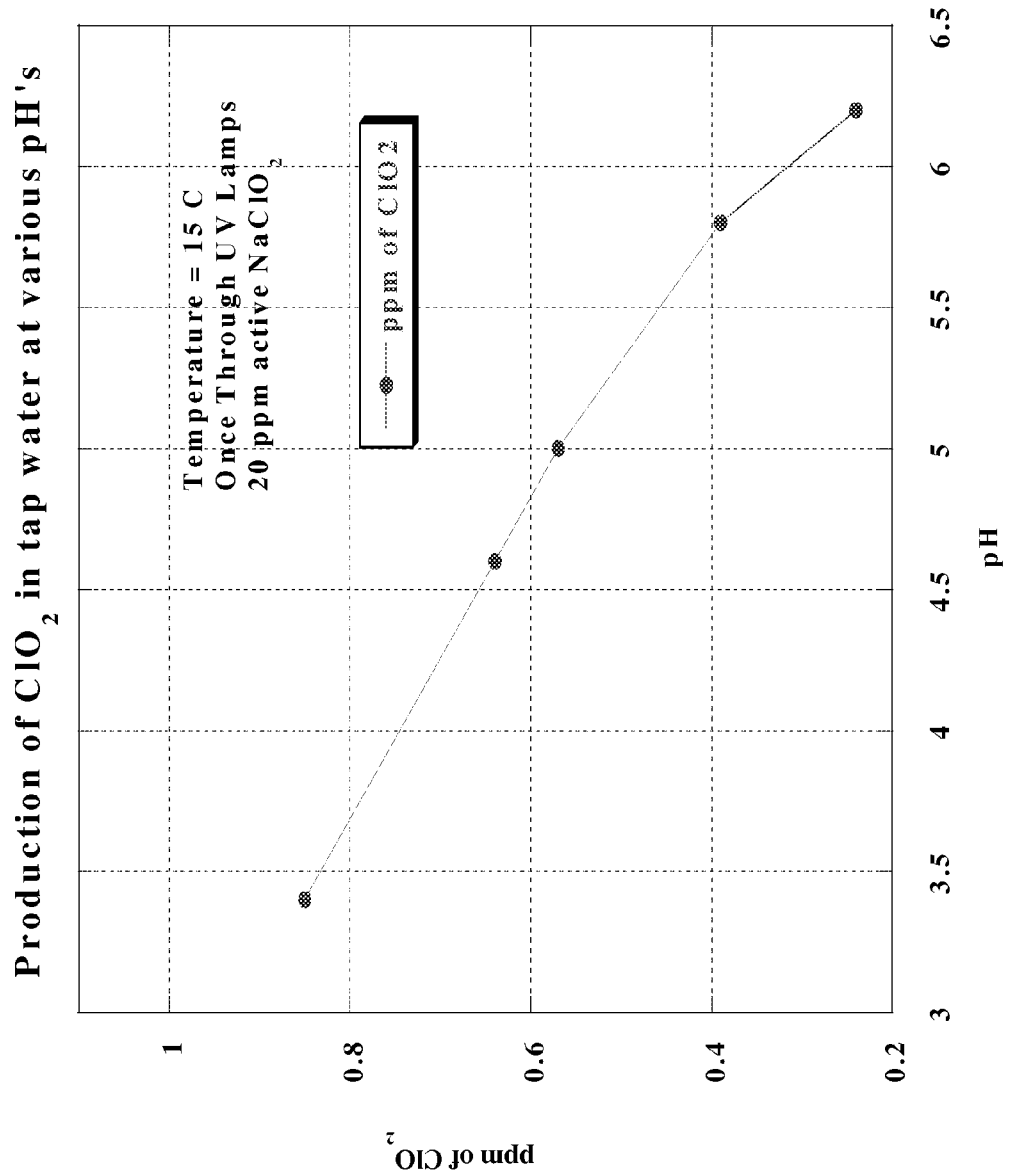
FIG. 2 illustrates the effect of pH on the chlorite conversion in a method according to the disclosure.

The pH of the reaction medium will also affect how much chlorine dioxide is produced. To demonstrate this, five gallons (18.9 liters) of tap water was placed into a reaction vessel and the pH was adjusted to an acidic pH using acid. Once the acid was added, a sample was taken and the pH measured. Next, the sodium chlorite was added and the solution was thoroughly mixed. The chlorite containing solution was pumped through a UV reaction chamber at a constant flow rate and collected. The concentration of the chlorine dioxide produced was determined using the Hach Low Range $ClO_2$ method. The results are shown below in the graph illustrated in FIG. 2.

Impact of UV Exposure on Chlorine Dioxide Production

Figure 3:
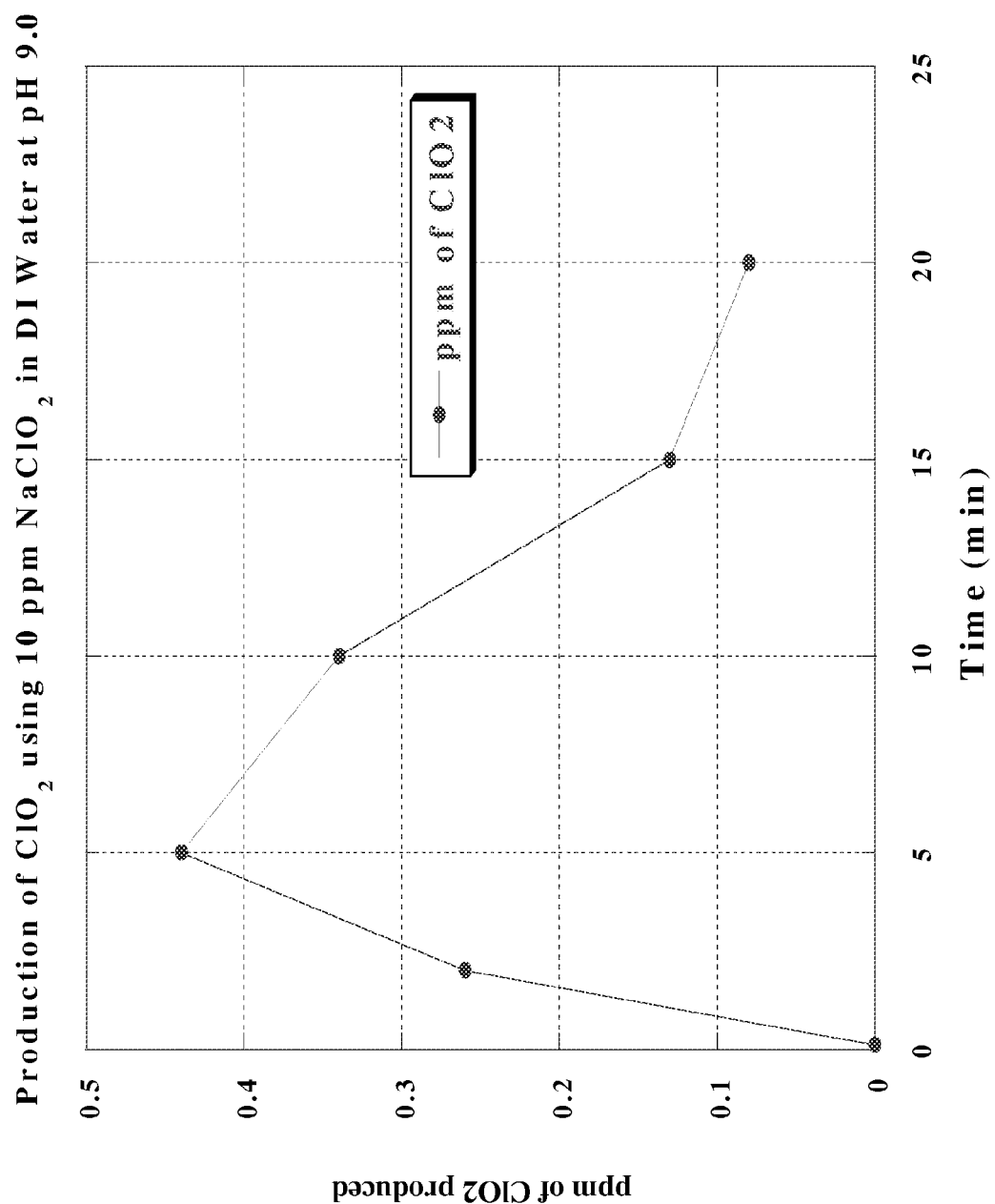
FIG. 3 illustrates the effect of residence time in the converter on the chlorite conversion in a method according to the disclosure.

The effect of prolonged exposure of chlorine dioxide solutions to UV light was also examined in the following experiments. First, five gallons (18.9 liters) of deionized water was placed into a reaction vessel along with predetermined amount of sodium chlorite and thoroughly mixed. The chlorite containing solution was the recirculated through the UV reaction chamber for 20 minutes at a flow rate of 2 gallons/minute (7.6 liters/minute). Samples were taken periodically and the concentration of the chlorine dioxide produced was determined using the Hach Low Range $ClO_2$ method. The results are shown in the graph illustrated in FIG. 3.

In another experiment, softened and dechlorinated municipal water containing sodium chlorite was passed through a UV reaction chamber that contained multiple UV lamps. The UV reactor could operate with any number of UV lamps either turned on or turned off. To determine the effect of the number of UV lamps (and hence UV intensity) on the production of chlorine dioxide, the number of lamps that were operating was varied and the amount of chlorine dioxide produced was determined using a Hach Chlorine Dioxide Analyzer. The chlorite containing solution was pumped through the UV reactor at a constant flow rate of 3.2 gallons (12.1 liters) per minute. The results are shown below in TABLE 4.

TABLE 4

| Trial | Number of Lamps Operating | $ClO_2$ produced (ppm) |
| --- | --- | --- |
| 1 | 1 | 0.42 |
| 2 | 2 | 0.56 |
| 3 | 3 | 0.52 |
| 4 | 5 | 0.40 |
| 5 | 7 | 0.28 |

These experiments demonstrate that the amount of UV exposure of the sodium chlorite precursor solution, and the resultant chlorine dioxide solution produced by the UV lamp, will be affected by how long the solutions are in the presence of the UV light. Controlling both flow rate and UV intensity are factors that can significantly improve the efficiency of the conversion of sodium chlorite to produce usable levels of chlorine dioxide while reducing the need for specialized equipment and improving safety.

Field Application of Low Concentration Chlorine Dioxide Generator

A prototype continuous chlorine dioxide generator according to the disclosure was installed at a Midwestern brewery for use as a cleaner for a packing conveyer in order to evaluate the utility of the disclosed method. A 9 ppm chlorite solution was then passed through a UV lamp assembly provided in the generator. This UV lamp assembly included both pretreatment cylinders and a treatment chamber that could be illuminated by as many as twelve 80-watt UV lamps. The target flow rate through the system was a constant 3.2 gpm (12.1 lpm).

An inline chlorine dioxide sensor, using a Hach 9187SC chlorine dioxide analyzer with SC100 controller, was used to monitor the amount of chlorine dioxide produced. The controller was configured so it could control the feed of the chlorite solution. These inline chlorine dioxide measurements were also confirmed with grab samples using a low concentration chlorine dioxide analysis method. The results showed that a measured maximum of 0.56 ppm chlorine dioxide production was obtained with 2 UV lamps and that chlorine dioxide production decreased when more UV lamps were brought online.

Data collected during this evaluation, and presented FIG. 4, reflect the advantages achieved by controlling the combination of UV exposure time and UV intensity to avoid creating an overexposure condition in which the chlorine dioxide production efficiency and the overall concentration can be reduced while simultaneously increasing the associated operating and materials costs. The performance of this evaluation unit demonstrated that inline measurement can be used to control the production of chlorine dioxide from weak sodium chlorite solutions by controlling the flow rate of chlorite solution to the unit through a feedback loop to reduce or suppress overexposure.

An example system for the continuous production of chlorine dioxide will include a treatment chamber (or chlorite reactor) configured for holding a known, although perhaps variable, volume of a dilute reaction solution, a source of UV illumination, a downstream chlorine dioxide monitor and a control system capable of adjusting one or more operating parameters within the treatment chamber to maintain a desired output level of chlorine dioxide. The operating parameters that may be adjusted by the control system may include, for example, the flowrate of the reaction solution through the treatment chamber, the illuminated area within the reaction chamber, the intensity of the UV illumination and the duration of the UV illumination.

An example method for the continuous production of chlorine dioxide will include feeding a dilute reaction solution into a reaction chamber, illuminating the dilute reaction solution with UV or near UV radiation to produce a concentration of chlorine dioxide within the treated reaction solution, i.e., the product solution, monitoring the concentration of chlorine dioxide in the product solution and adjusting one or more of the reaction solution flowrate, the reactant concentration within the reaction solution, the reaction solution pH, the intensity and/or wavelength of the illumination, the duration of the illumination or the illuminated area of the reaction chamber in response to variations in the detected concentration of chlorine dioxide. As will be appreciated by those skilled in the art, various pretreatment methods may be implemented to provide a reaction solution having the target pH, reactant concentration, clarity, temperature, etc. in order to achieve the concentration of chlorine dioxide desired for a particular application and/or to compensate for variations, whether random or seasonal, in the initial feed stream(s) used in formulating the dilute reaction solution.

Figure 5:
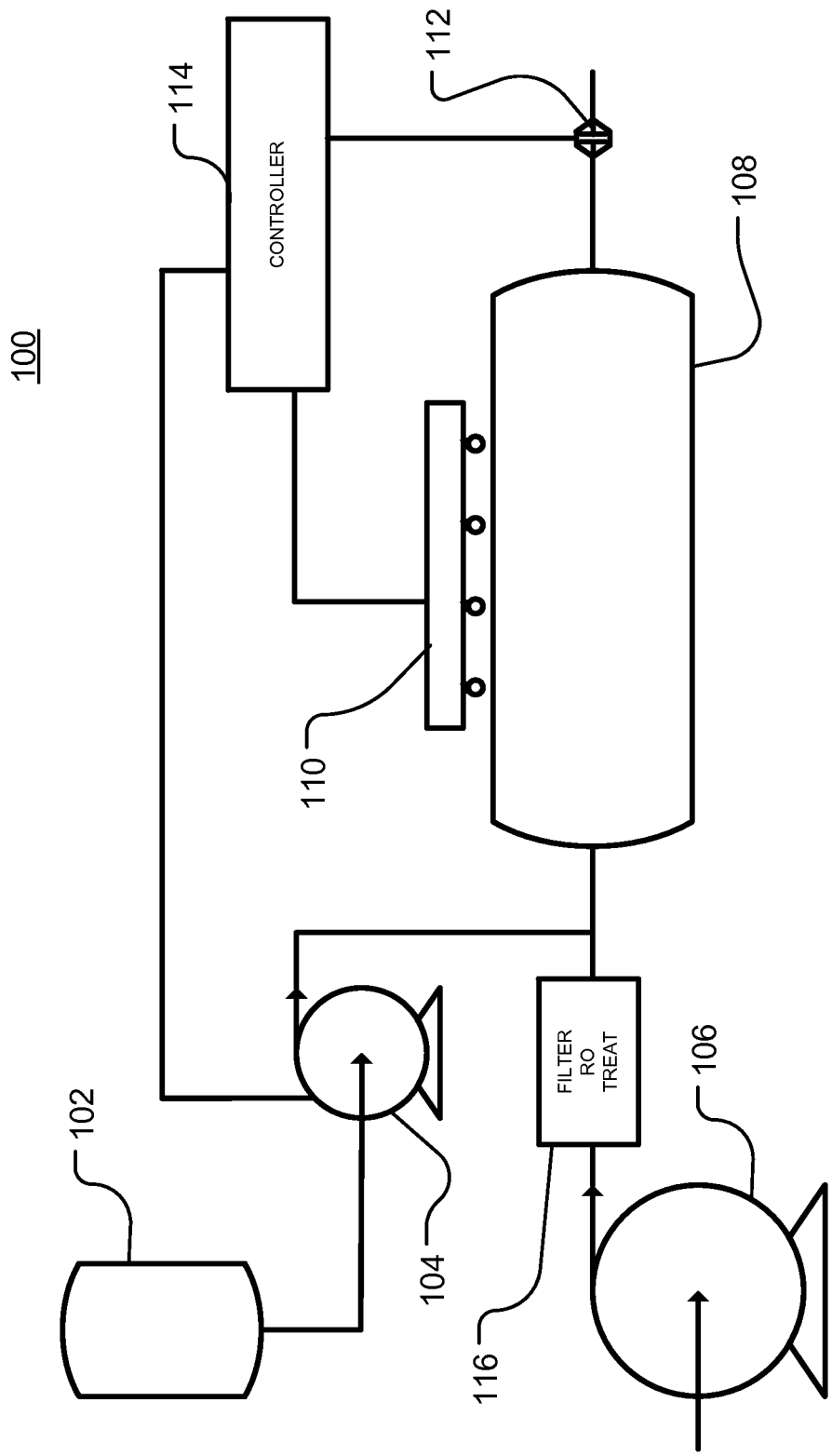
FIG. 5 illustrates some basic components of a system according to the disclosure.

A basic example system 100 for practicing the disclosed method is illustrated in FIG. 5, in which a concentrated chlorite solution is maintained in tank 102 and until pump 104 is activated to feed the solution from the tank into the feed line and form a low concentration reaction solution. The feed water is fed into the system through pump 106 and may be subjected to additional treatment before (not shown) or after the pump in one or more vessels 116. As detailed above, treatments may include, for example, filtering, softening, pH adjustment, reverse osmosis (RO) and/or ion exchange in order to provide feed water of sufficient quality for forming the low concentration reaction solution. The low concentration reaction solution is then fed into treatment chamber 108 where it is subjected to UV radiation from a suitable UV source 110.

As shown in FIG. 5, the reaction product solution, with its typically sub-ppm $ClO_2$ concentration then passes through one or more monitors 112 in order to determine the $ClO_2$ concentration and, optionally, other parameters of the product stream including, for example, pH, flowrate, resistivity, total dissolved solids (TDS), chlorite concentration and/or other relevant factors. A signal corresponding to the $ClO_2$ concentration, and perhaps other parameters, is then transmitted to a controller 114 that is configured for controlling one or more variables including, for example, chlorite feed rate, feed water flowrate and/or UV exposure intensity in order to maintain the $ClO_2$ concentration of the product stream within a target range.

As will be appreciated by those skilled in the art, additional elements may be utilized to support the apparatus including, for example, pumps, filters, pretreatment regions, pipes, valves, vessels and other sensors that can be adapted for a particular application of the method and apparatus. As will also be appreciated by those skilled in the art, for the purpose of this application, the term "continuous" is used in the engineering sense in contrast to "batch" processing in that once started, the chlorine dioxide generation can continue indefinitely until, for example, one or more of the necessary supplies are exhausted, there is an equipment failure or simply a decision to shut down for maintenance or at the end of the production shift.

It is anticipated that the disclosed method will reduce the need for special handling, allow the production and use of portable continuous chlorine dioxide generators and/or reduce the cost associated with utilizing chlorine dioxide more widely as a disinfectant, particularly within food production and potable water operations.

We claim:

1. A method for the continuous production of an aqueous stream containing low concentrations of chlorine dioxide, comprising:
   forming a low concentration chlorite feed stream;
   exposing the feed stream to UV radiation sufficient to convert no more than 10% of the chlorite to chlorine dioxide and thereby produce an aqueous product stream having target chlorine dioxide concentration suitable for direct application in an open environment;
   determining a chlorine dioxide concentration in the product stream; and
   controlling the chlorite feed stream based on the determined chlorine dioxide concentration.

2. The method for the continuous production of an aqueous stream containing low concentrations of chlorine dioxide according to claim 1, wherein:
   the low concentration chlorite feed stream has a chlorite concentration of no more than 10 ppm.

3. The method for the continuous production of an aqueous stream containing low concentrations of chlorine dioxide according to claim 1, wherein:
   the target chlorine dioxide concentration is no more than 1 ppm.

4. The method for the continuous production of an aqueous stream containing low concentrations of chlorine dioxide according to claim 1, wherein:
   the target chlorine dioxide concentration is no more than 750 ppb.

5. The method for the continuous production of an aqueous stream containing low concentrations of chlorine dioxide according to claim 1, wherein:

the target chlorine dioxide concentration is from 0.00005 wt % to 0.00002 wt %.

6. The method for the continuous production of an aqueous stream containing low concentrations of chlorine dioxide according to claim 1, wherein forming the low concentration chlorite feed stream further comprises:

forming a concentrated chlorite solution;

forming a feed water stream; and mixing a quantity of the concentrated chlorite solution with the feed water stream.

7. The method for the continuous production of an aqueous stream containing low concentrations of chlorine dioxide according to claim 6, wherein forming a feed water stream further comprises:

treating a water stream from a municipal water source to improve chlorite conversion.

8. The method for the continuous production of an aqueous stream containing low concentrations of chlorine dioxide according to claim 7, wherein treating a water stream from a municipal water source further comprises:

subjecting the water stream to a least one operation selected from a group consisting of filtering, softening, adjusting pH, reverse osmosis treatment and ion exchange treatment.

9. The method for the continuous production of an aqueous stream containing low concentrations of chlorine dioxide according to claim 1, wherein exposing the feed stream to UV radiation sufficient to produce an aqueous product stream having target chlorine dioxide concentration further comprises:

controlling at least one of the intensity of the UV radiation and the duration of the exposure of the feed stream to UV radiation whereby an increase or a decrease of more than 50% in the exposure reduces the chlorite conversion.

* * * * *